United States Patent [19]

Imoto et al.

[11] Patent Number: 5,916,460
[45] Date of Patent: Jun. 29, 1999

[54] METHOD AND APPARATUS FOR DICING A SUBSTRATE

[75] Inventors: Katsuyuki Imoto, Saitama-ken; Shinobu Sato, Ibaraki-ken, both of Japan

[73] Assignee: Hitachi Cable, Ltd., Tokyo, Japan

[21] Appl. No.: 08/675,911

[22] Filed: Jul. 5, 1996

[30] Foreign Application Priority Data

Jul. 7, 1995 [JP] Japan .................................... 7-172256

[51] Int. Cl.⁶ ................................................ B23K 26/00
[52] U.S. Cl. ............................. 219/121.67; 219/121.72; 219/121.84; 438/463
[58] Field of Search ........................ 219/121.67, 121.72, 219/121.84, 121.62, 121.83, 121.61; 438/463

[56] References Cited

U.S. PATENT DOCUMENTS

| | | | |
|---|---|---|---|
| 3,629,545 | 12/1971 | Graham et al. | 219/121.72 |
| 3,749,878 | 7/1973 | Sullivan et al. | 219/121.67 |
| 4,224,101 | 9/1980 | Tijburg et al. | 219/121.72 |
| 4,467,168 | 8/1984 | Morgan et al. | 219/121.67 |
| 4,543,464 | 9/1985 | Takeuchi | 219/121.68 |
| 4,945,207 | 7/1990 | Arai | 219/121.72 |
| 5,040,185 | 8/1991 | Hill . | |
| 5,214,261 | 5/1993 | Zapella | 219/121.67 |
| 5,239,160 | 8/1993 | Sakura et al. | 219/121.82 |
| 5,641,416 | 6/1997 | Chadha | 438/463 |

FOREIGN PATENT DOCUMENTS

| | | | |
|---|---|---|---|
| 60-251138 | 12/1985 | Japan . | |
| 62-244592 | 10/1987 | Japan | 219/121.61 |
| 2-276234 | 11/1990 | Japan . | |
| 3-221286 | 9/1991 | Japan | 219/121.61 |
| 4-121765 U | 10/1992 | Japan . | |
| 4-356385 | 12/1992 | Japan . | |
| 6-39568 | 2/1994 | Japan | 219/121.75 |
| 6-106378 | 4/1994 | Japan . | |
| 6-269968 | 9/1994 | Japan . | |
| 8-116120 | 5/1996 | Japan . | |

*Primary Examiner*—Geoffrey S. Evans
*Attorney, Agent, or Firm*—McDermott, Will & Emery

[57] ABSTRACT

A laser device dices a substrate by generating a continuous wave-oscillation laser beam 3 that is converged by a lens 4 and focused at a predetermined focus O between the surface of the substrate 1 and a tip of a nozzle of a guide 5. Then, the focus is expanded to result in a laser beam $3a$ having a beam spot diameter of S at the surface of the substrate 1. A flow of assist gas $G_0$, $G_1$, $G_2$ having a predetermined constant pressure is supplied from a gas intake 6 surrounding the laser beam 3. As the laser beam $3a$ is defocused, the beam spot diameter S is expanded and its energy distribution is moderated. The gas is blown onto the substrate 1 at constant pressure in order to suppress generation of strains due to thermal deformation.

22 Claims, 13 Drawing Sheets

1
SUBSTRATE

1

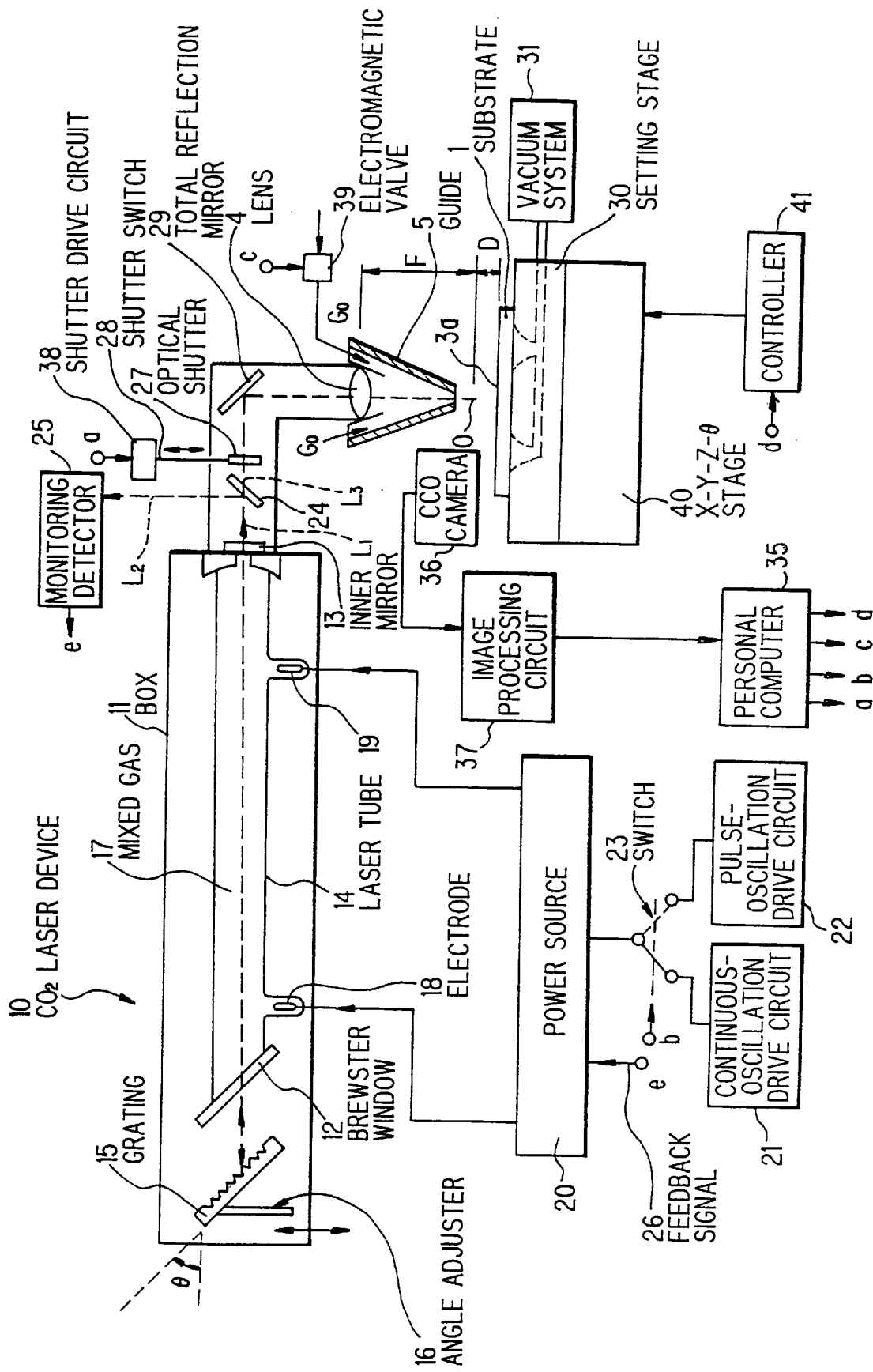

METHOD AND APPARATUS FOR DICING A SUBSTRATE

BACKGROUND OF THE INVENTION

This invention relates to a method and an apparatus for dicing a substrate, and more particularly to, a method and an apparatus for dicing a substrate by a laser beam irradiation process.

These days, the development of devices in which electronic circuits, optical circuits etc. are provided on a substrate, such as glass material, magnetic material, semiconductor material, or dielectric material substrate, has been activated. From several to several thousand devices are formed in, and/or on a surface or back side of the substrate, so that it must be diced, i.e. be cut and divided into each pieces of the devices at the final step of the process.

A conventional method for dicing a substrate comprises setting a substrate on a stage by a vacuum system, irradiating a laser beam, such as $CO_2$ (carbon dioxide) laser beam, on the substrate with blowing off gas using a guide, and moving the stage so that the laser beam is irradiated to follow a track for dicing, wherein the laser beam is focused at a surface of the substrate.

In the conventional method for dicing a substrate, however, there is a disadvantage in that many undesirable micro-cracks develop, due to thermal deformation stress, on a surface, a back side or a diced plane of the substrate. Therefore, the surfaces of the diced planes are not flat. Another disadvantage is that it is difficult to dice the substrate closely following the tracks on which the laser beam is irradiated.

SUMMARY OF THE INVENTION

Accordingly, it is an object of the invention to provide a method and an apparatus for dicing a substrate by which generation of undesirable micro-cracks is avoided.

It is a further object of the invention to provide a method and an apparatus for dicing a substrate by which diced planes of the substrate are flat.

It is a still further object of the invention to provide a method and an apparatus for dicing a substrate by which the substrate are diced closely following the tracks on which the laser beam is irradiated.

According to the first feature of the invention, a method for dicing a substrate, comprises:

generating a laser beam;

flowing a gas by which the laser beam is surrounded;

moving a substrate relatively against the laser beam; and dicing the substrate by irradiating the laser beam;

wherein the laser beam is focused above the substrate at a predetermined distance to that a defocused laser beam is irradiated en the surface of the substrate, and a pressure of the gas is kept constant.

According to the second feature of the invention, a method for dicing a substrate, comprises:

generating a pulse-oscillation laser beam;

irradiating the pulse-oscillation laser beam at one side of a static substrate without a gas flow so as to generate an initial crack;

generating a continuous wave-oscillation laser beam;

flowing a gas by which the continuous wave-oscillation later beam is surrounded;

moving the substrate relatively against the continuous wave-oscillation laser beam; and dicing the substrate by irradiating the continuous wave-oscillation laser beam so as to develop the initial crack into break;

wherein the laser beam is focused above said substrate at a predetermined distance so that a defocused laser beam is irradiated on the surface of the substrate, and a pressure of the gas is kept constant.

According to the third feature of the invention, a method for dicing a substrate, comprises:

generating a laser beam;

flowing a gas by which the laser beam is surrounded;

moving a substrate relatively against the laser beam with a predetermined inclined angle; and dicing the substrate by irradiating the laser beam;

wherein the laser beam is focused above the substrate at a predetermined distance so that a defocused laser beam is irradiated on the surface of the substrate, and a pressure of said gas is kept constant.

BRIEF DESCRIPTION OF THE DRAWINGS

The invention will be explained in more detailed in conjunction with the appended drawings, wherein:

FIG. 7 is an explanatory view showing an apparatus for dicing a substrate in a second preferred embodiment according to the invention.

DESCRIPTION OF THE PREFERRED EMBODIMENTS

Before explaining a method and an apparatus for dicing a substrate in the first preferred embodiment, the aforementioned conventional method and apparatus will be explained with reference to FIGS. 1 and 2.

Figure 1:
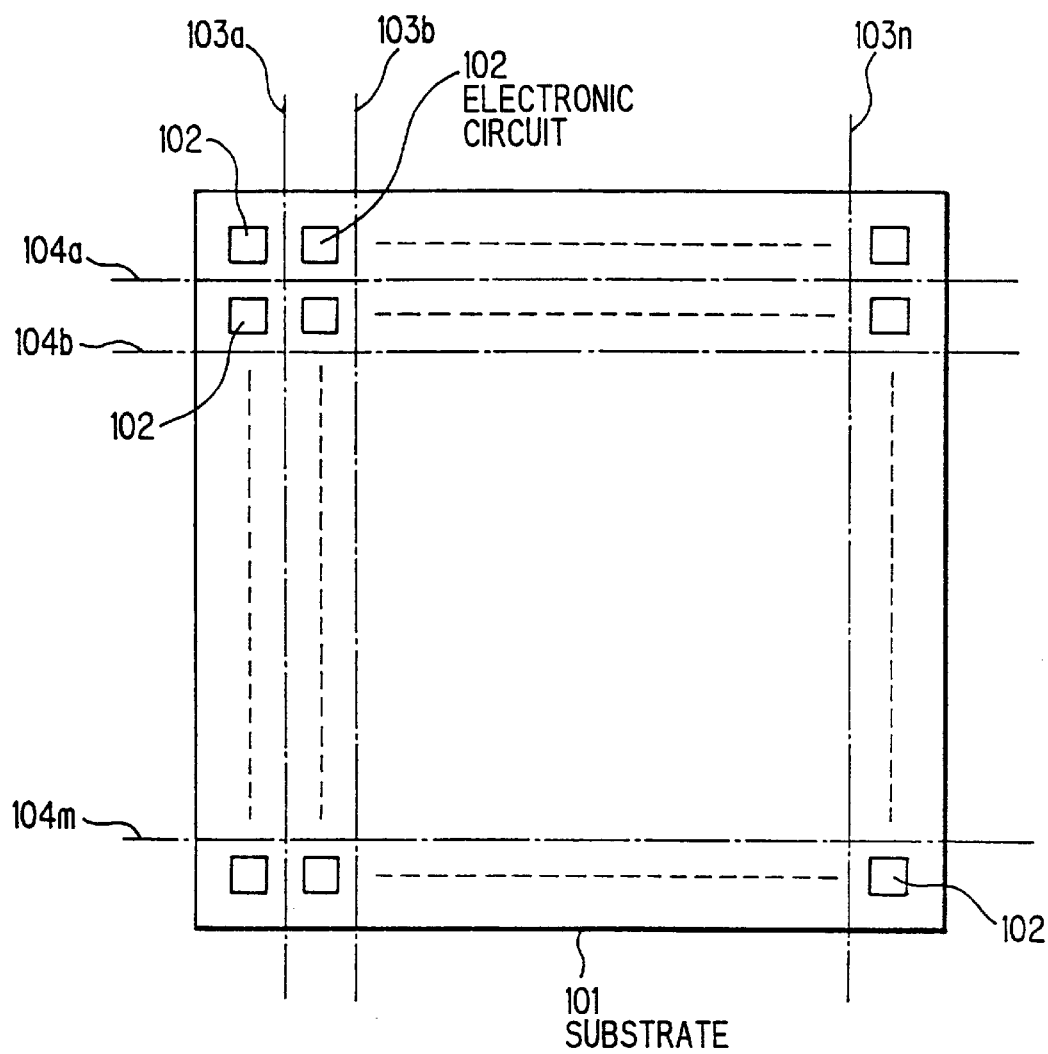
FIG. 1 is a plane view showing a substrate with electronic circuits to be diced by a conventional method for dicing the substrate.

In the conventional method for dicing a substrate, a substrate 101 on which a plurality of electronic circuits 102 are formed lengthwise and crosswise, such as shown in FIG. 1, is cut on the tracks shown as one-dotted lines 103a ... 103n and 104a ... 104m, then divided into each pieces of devices by a diamond blade dicing method or laser scribing method.

Figure 2:
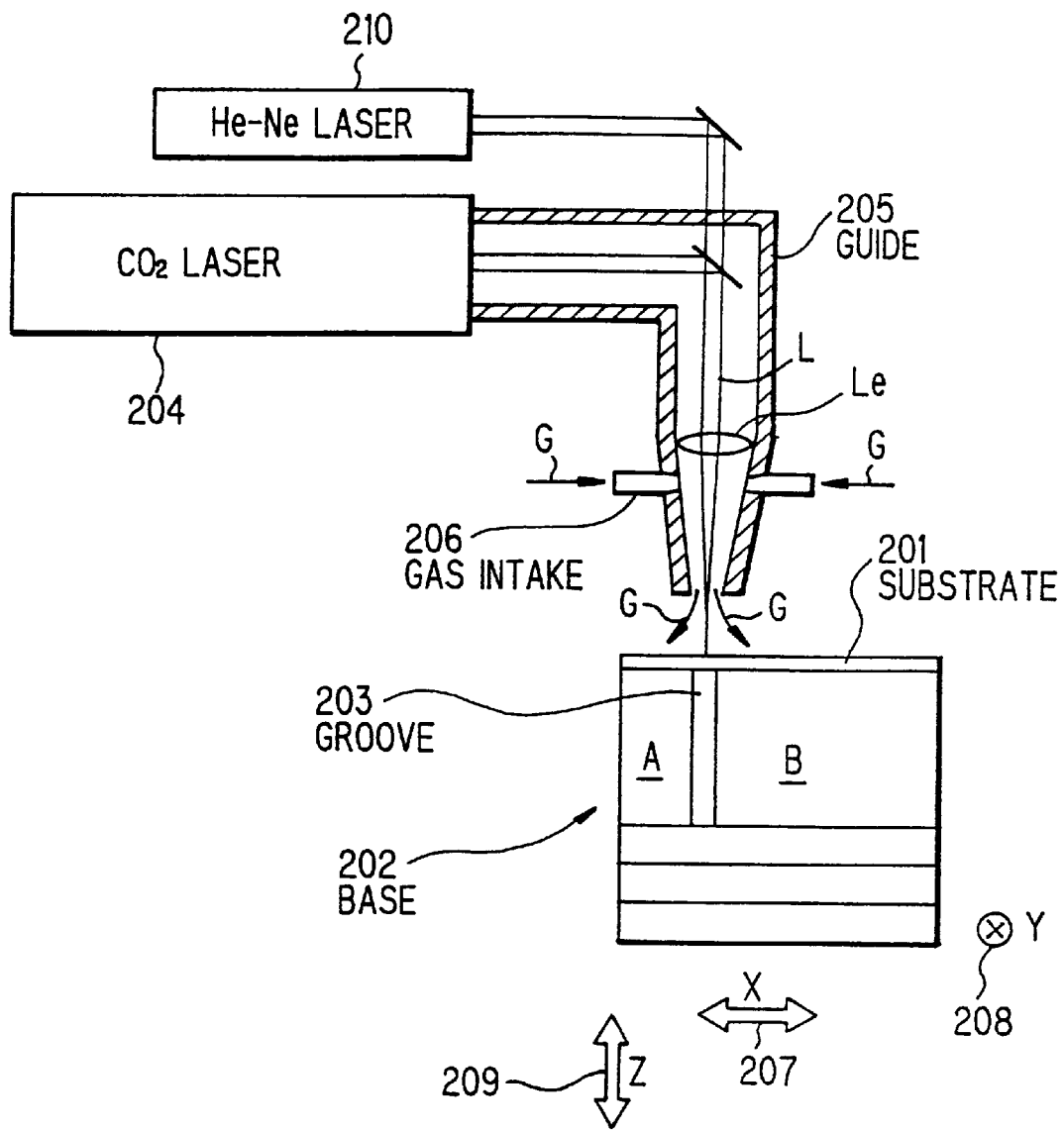
FIG. 2 is an explanatory view showing a conventional apparatus for cutting a glass substrate by $CO_2$ laser beam which has been proposed by the applicant.

FIG. 2 shows a conventional apparatus for cutting a glass substrate utilizing the latter method, which has been proposed by the applicant (Japanese Published Application no. 6-269968). The device comprises a base 202 for setting and moving a substrate 201, a $CO_2$ laser 206, a guide 205 for guiding a $CO_2$ laser beam L, and a gas intake 206 for supplying assist gas G.

In operation, a glass substrate 201 is set on the base 202 by vacuuming side A and B thereof to be cut being vacuumed thereon, and to be moved-by the base 202 in X 207, Y 208 and Z 209 directions The $CO_2$ laser beam L is output from the $CO_2$ laser 204, guided by the guide 205, converged by a lens Le and irradiated on the substrate 201. Assist gas G, which is supplied from the gas intake 206, is used for surrounding the laser beam L and blowing off on the substrate 201. The base 202 is provided with a groove 203 so that the laser beam L can penetrate the substrate 201, thereby the same cutting conditions are obtained during operation. A He—Ne laser 207 is used for indicating a spot on the substrate where the laser beam is irradiated,.

In the conventional method and apparatus for dicing a substrate, depending on an output power of the $CO_2$ laser beam, moving rate of the substrate, and pressure of the assist gas, it is sometimes difficult to dice a substrate of ceramic or glass without generating undesirable cracks.

When the output power is high, the substrate is dices by an evaporation phenomenon. However, there are many cracks generated on a surface, a back side, and diced planes of the substrate due to thermal deformation, and dross on the back side thereof. In contrast, when the output power is low, the dicing is not possible due to the lack of such an evaporation phenomenon.

If the output power is set to an intermediate, level the substrate can break by a breaking phenomenon. However, there are still micro-cracks generated on a surface, a back side and diced planes thereof, and about 10 $\mu$m of ruggedness may be observed thereon.

The moving rate of the substrate correlates with the output power of the laser beam. That is to say, when the output power is constant and the moving rate becomes low with, the above mentioned evaporation phenomenon occur. If the moving rate becomes high in a certain range, the breaking phenomenon occur. But if it becomes much higher, no more breaking phenomenon occur. These breaking or evaporation phenomenon also depends on the pressure of the assist gas, which are similar to what are observed by varying the moving rate of the substrate stated above. If the pressure of the gas is low, the disadvantage such as generation of cracks and dross due to evaporation phenomenon, are likely to be observed, But if it is higher above a certain range thereof, breaking phenomenon are observed.

Furthermore, when multi-component glass substrates, such as an alkali-free glass substrate, a borosilicate glass substrate, etc., are used on condition that evaporation phenomenon occur, such that the laser power is high and both the moving rate of the substrate and the pressure of the assist gas are low, etc., large cracks occur on the surface, the back side and the diced planes thereof, and such cracks result into breaking. Therefore highly rugged surfaces are likely to occur.

On limited condition that breaking phenomenon occur, such that the laser power is low and both the moving rate of the substrate and the pressure of the assist gas are high, etc., the substrate is broke but many similar micro-cracks are observed, which will gradually develop into large cracks and end up breaking the substrate while leaving it for a long period of time.

In addition to such phenomenon, it is difficult to dice the substrate closely following the tracks on which the laser beam is irradiated. For instance, the substrate may break curvedly in part or as a whole, even if dicing is intended to be performed in a straight line.

The reasons for preventing good dicing are studied by the inventors viewing from a various angle. As a result, it is found that it is because an energy distribution of the irradiated laser beam at the surface of the substrate is a narrow distribution such as a Gaussian distribution. This is why the conventional method and apparatus are designed to make a laser beam focused on the surface of the substrate, where beam spot diameter is minimum. In a conventional method and apparatus for cutting, dicing or welding etc., using a laser beam, it is understood that the smaller (less than 100 $\mu$m) the beam spot diameter is, the more precise cutting, dicing or welding, etc., are provided.

On the other hand, according to the invention, it is recognized by the inventors that having a temperature distribution on the surface of the substrate moderated in a larger area (500~2000 $\mu$m diameter) thereof and asymmetric in its dicing direction easily generates an appropriate crack due to thermal stress and facilitates development of the crack in the dicing direction. As a result, the generation of micro-cracks are suppressed, and the substrate is diced closely and follows the tracks of the laser beam.

Next, a method for dicing a substrate in the first preferred embodiment will be explained in FIG. 3 and 4.

Figure 3:
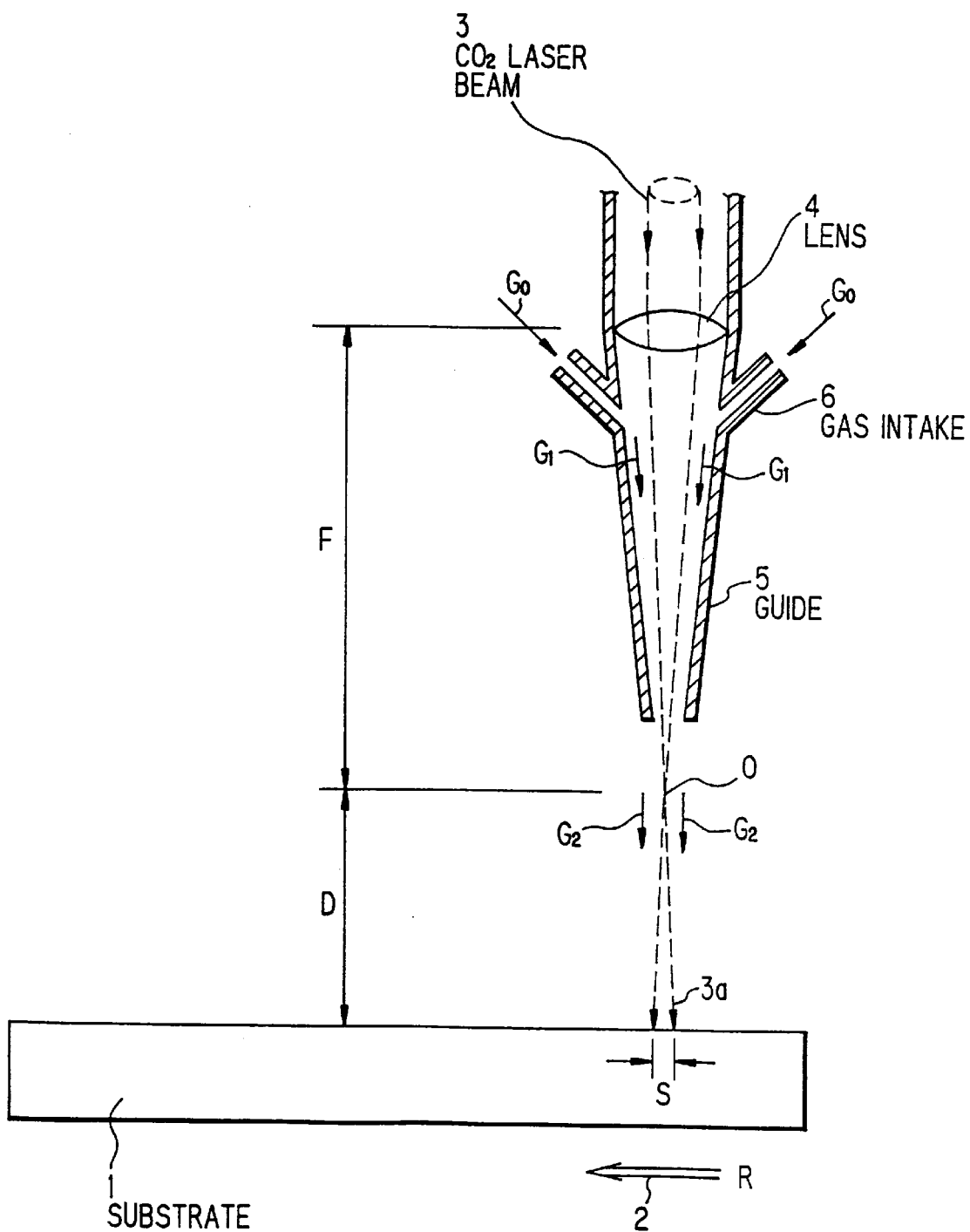
FIG. 3 is an explanatory view showing a principle of a method for dicing a substrate in a first preferred embodiment according to the invention.

As shown in FIG. 3, while a substrate 1, such as nonmetallic material substrate, is moved in the arrow direction 2 at a moving rate of R, a $CO_2$ laser beam 3 is irradiated on a surface of the substrate. The laser beam 3 is converged by a lens 4 and focused at a predetermined focus O between the surface of the substrate 1 and a tip of a nozzle of a guide 5, where the distance from the lens 4 is F. After passing through the focus O, the laser beam 3 is expanded to be a beam 3a having a beam spot diameter of S at the surface of the substrate 1 where a distance from the focus O is D.

In the embodiment, it is first required that the laser beam 3 is designed to be defocused at the surface of the substrate 1, preferably the distance D is determined in order to generate a beam spot diameter S of approximately 500~2000 $\mu$m, which is approximately 8~16mm.

Second, it is required that a flow of assist gas $G_0$, $G_1$, $G_2$ supplied from a gas intake 6 surrounds the laser beam 3. The assist gas may include $N_2$, Ar, air, $O_2$ or a mixture of such gases. The pressure of the gas needs to be at least 2 $Kg/cm^3$. When the pressure is low, micro-cracks occur, But the higher it is, the less micro-cracks are generated and flatter dices planes are obtained. In the embodiment, a continuous wave-oscillation laser beam is used as the laser beam 3.

The output power of the laser beam correlates with the moving rate of the substrate. An output power of at least 50 W and a moving rate of at least 5 mm/sec are necessary in the embodiment. The value of the output power of the laser beam is measured at the focus O without gas flow. If the value is more than 50 W, the moving rate of the substrate may be more than 5 mm/sec. For example, the moving rate should be no less than approximately 18 mm/sec at the output power of 100 W.

Figure 4:
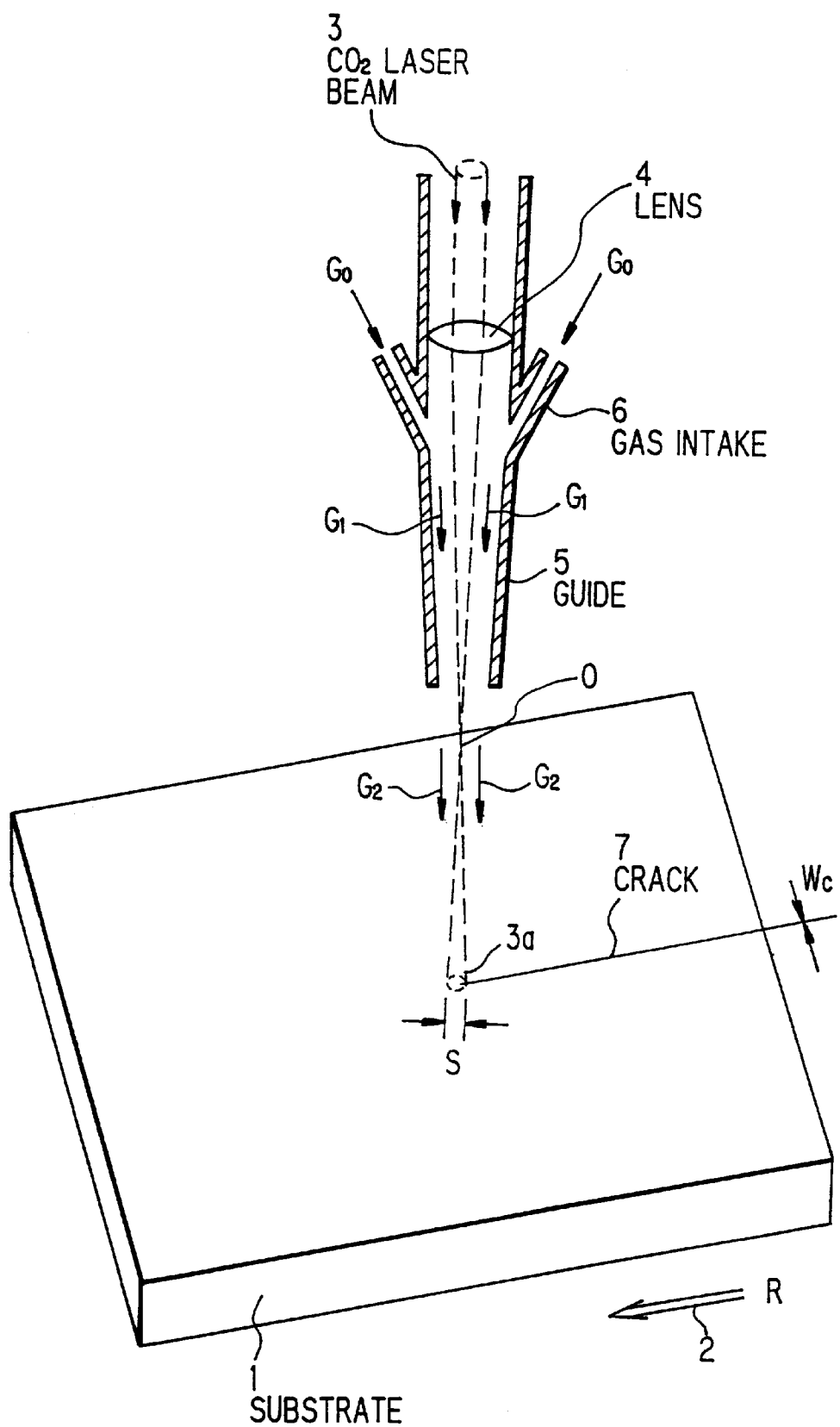
FIG. 4 is an explanatory view showing a method for dicing a substrate in the first preferred embodiment according to the invention.

In the embodiment, as shown in FIG. 4, a leading crack 7 due to thermal stress occurs and develops. The crack closely follows the track of the laser beam, and the substrate 1 breaks with the dicing margin width Wc of zero.

The substrate may include ceramic substrates, such as alumina, mullite, steatite, forsterite, etc., multi-component glass substrates, such as borosilicate glass, lead potassium sodiumsilicate glass, aluminosilicate glass, bariumborosilicate glass, etc. and semiconductor substrates, such as Si substrate having Si-oxide cladding. Substrates having the thickness of about several hundred $\mu$m~several mm may be used in the embodiment.

In the embodiment, as the laser beam is defocused, the beam spot diameter at the surface of the substrate is expanded and energy distribution thereof is moderated. Furthermore, as gas is blown onto the substrate at constant pressure, such moderation is facilitated and expanded. Therefore, generation of strains due to thermal deformation is suppressed, and generation of micro-crack are observed.

Next, an apparatus for dicing a substrate in the first preferred embodiment will be explained in FIG. 5, wherein like parts are indicated by like reference numerals as used in FIGS. 3 and 4. The apparatus comprises a $CO_2$ laser device 10 for outputting ($L_1$) a laser beam 3, a power source 20 for oscillating the $CO_2$ laser device 10, a monitoring detector 25 for monitoring a part of the laser beam ($L_2$), a lens 4 for converging the laser beam 3, a guide 5 for blowing assist gas $G_0$, a setting stage 30 for setting a substrate 1 due to section created by a vacuum system 31, and an X-Y stage 32 for moving the substrate 1 in X and Y directions via a motor drive. The $CO_2$ laser device 10 is provided with a laser tube 14 having a Brewster window 12 and an inner mirror 13 for an output port at both ends thereof, respectively, a grating 15 approximately opposed to the Brewster window 12, and an angle adjuster 16 for adjusting the angle $\theta$ of the grating 15 inside a box 11. The laser tube 14 is sealed with a mixed gas 17 ($CO_2$:$N_2$:He=8:18:74) and both sides are provided with electrodes 18 and 19, respectively. High voltage is supplied to the electrodes 18, 19 from the power source 20, to which a continuous wave-oscillation circuit 21 or a pulse-oscillation circuit 22 are selectively connected by a switch 23. The grating 15 is used for selecting a signal light of at least one wavelength by adjusting the angle $\theta$ and outputting it from the inner mirror 13 along the pass $L_1$.

A part of the output laser beam ($L_2$) is reflected by a half mirror 24 and monitored by the monitoring detector 25. An output signal of the monitoring detector 25 is returned as a feedback signal 26 to the power source 20, thereby the output power of the laser beam is controlled as a constant value. In the embodiment, the output power may be controlled controlling a temperature by using cooling water circulated around the inner mirror 13, the laser tube 14, and a side plane of the grating 15.

In operation, a pass L, of the laser beam 3 is opened or closed by an optical shutter 27, which is controlled by a shutter switch 28. The laser beam 3 which passes through the half mirror 24 and the pass $L_3$ is reflected by a total reflection mirror 29 and converged by the lens 4 and focused at the focus O. The assist gas G0 which surrounds the laser beam 3 is supplied and blown onto on the substrate 1 from the guide 5. The laser bean 3 is expanded to be a beam 3a having a beam spot diameter S at the surface of the substrate 1.

As the laser beam is defocused, the beam spot diameter at the surface of the substrate is expanded and energy distribution thereof is moderated. Furthermore, as gas is blown onto the substrate at constant pressure, such moderation is facilitated and expanded. Therefore, generation of strains due to thermal deformation is suppressed, In the embodiment, as described before, the grating is used as one side of an optical resonator in the $CO_2$ laser device in order to change the oscillation wavelength of the laser beam by adjusting the angle thereof. If a signal light of at least one wavelength is selected and output, flatter surfaces of the dicing planes are obtained, and precision and reproducibility are further improved. Without the grating, the laser device oscillates with a wide spectrum distribution of 9.1 $\mu$m~11.3 $\mu$m wavelength. In this case, the optical mode in the beam spot S at the surface of the substrate is multi-mode. Therefore, nonuniform cracks are generated and it is difficult to dice the substrate closely following the tracks on which the laser beam is irradiated.

FIG. 6 shows a method for dicing a substrate in a second preferred embodiment, which is preferably used for dicing substrates, such as multi-component glass substrates, upon the surface of which it is difficult to generate cracks due to thermal stress by simply irradiating the laser beam. In the embodiment, the apparatus shown in FIG. 5, is used, wherein a laser beam is irradiated by driving a pulse-oscillation drive circuit 22, to generate an initial crack 33 at one edge of the substrate 1. The pulse width is chosen between 100 $\mu$sec~2 msec, with a repetition speed between 50 pps~1 kpps. Next, assist gas G0 ($N_2$, its pressure of more than 2 Kg/cm$^2$) is supplied, and the pulse-oscillation drive circuit 22 is switched to the continuous wave-oscillation drive circuit 21 by the switch 23. The laser beam is traced from one side of the substrate 1 to the other, the initial crack 33 is developed into a leading crack 34, and breaks.

According to the embodiment, the dicing speed is 1.2~1.8 times as high as that in the method shown in FIG. 4. It is preferable that the initial crack is created by making the beam spot diameter as narrow as possible. This improves the straightness of the leading crack by the following continuous wave-oscillation.

Figure 5:
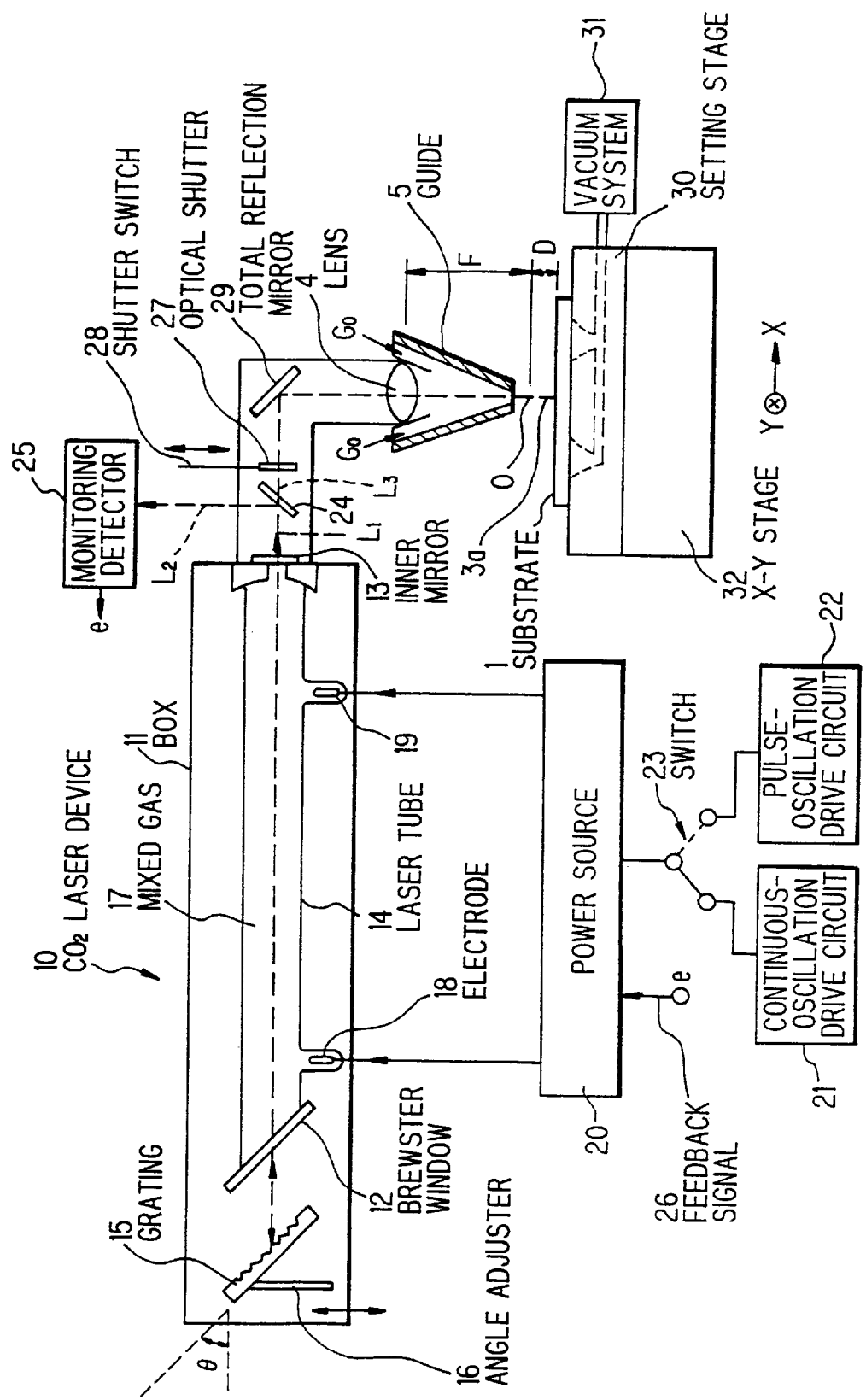
FIG. 5 is an explanatory view showing an apparatus for dicing a substrate in a first preferred embodiment according to the invention.

FIG. 7 shows an apparatus for dicing a substrate in the second preferred embodiment, wherein like parts are indicated by like reference numerals as used in FIG. 5. In the embodiment, many parts and circuits are automatically operated by a digital computer 35. Alignment marks (not shown), such as lines or dots, are provided on the surface such as the substrate 1, whereby information of dicing position is detected by a CCD camera 36. Then, the information is processed by an image processing circuit 37, and input to the digital computer 35 and calculated. Output signals a, b, c and d of the digital computer 35 are input to the shutter drive circuit 38, the switch 23, an electromagnetic valve for gas supply 39 and a controller 41, respectively. According to the embodiment, automatic and labor-saving operation is realized and reproducibility and reliability are improved.

Figure 8:
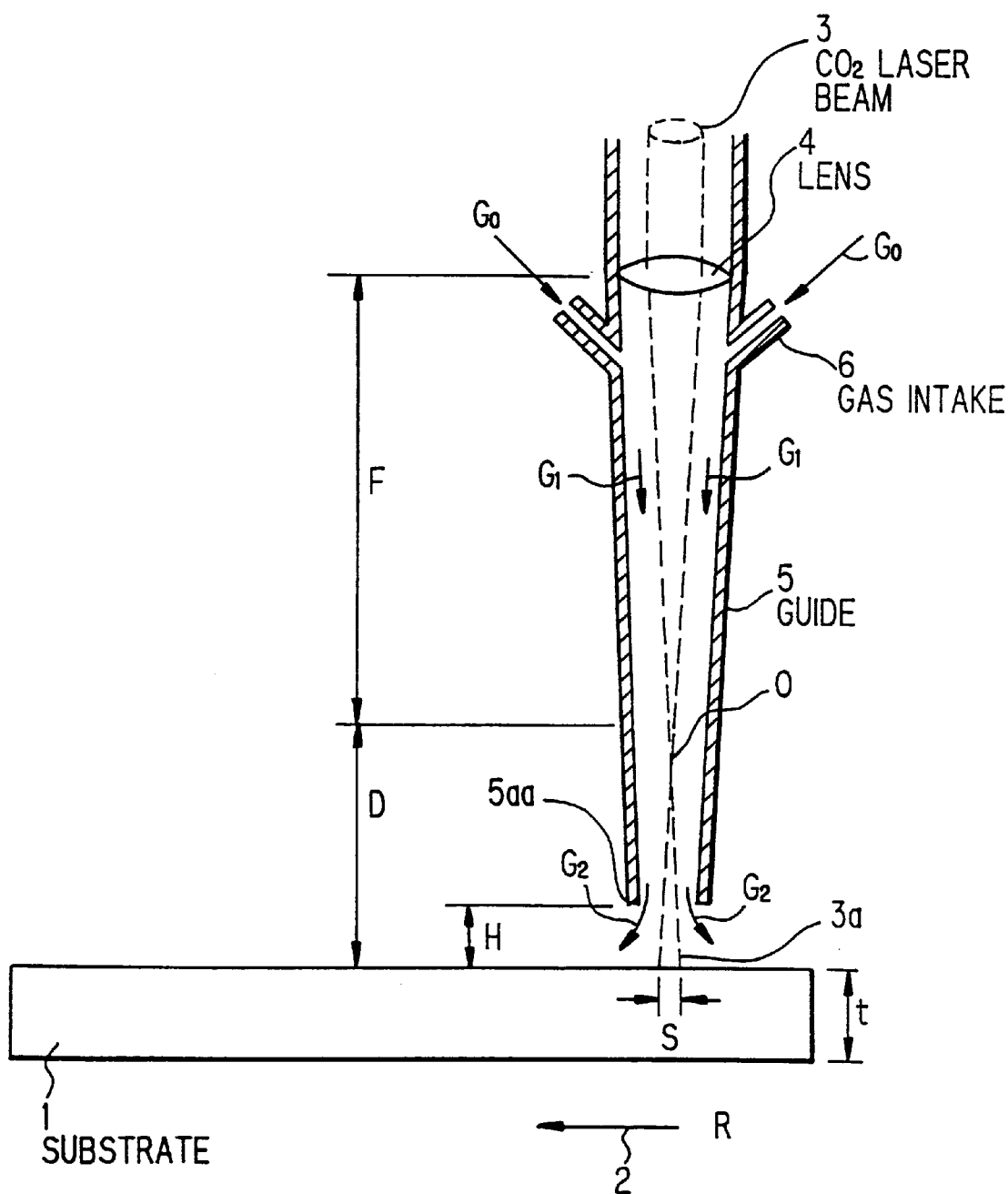
FIG. 8 is an explanatory view showing a principle of a method for dicing a substrate in a third preferred embodiment according to the invention.
Figure 9:
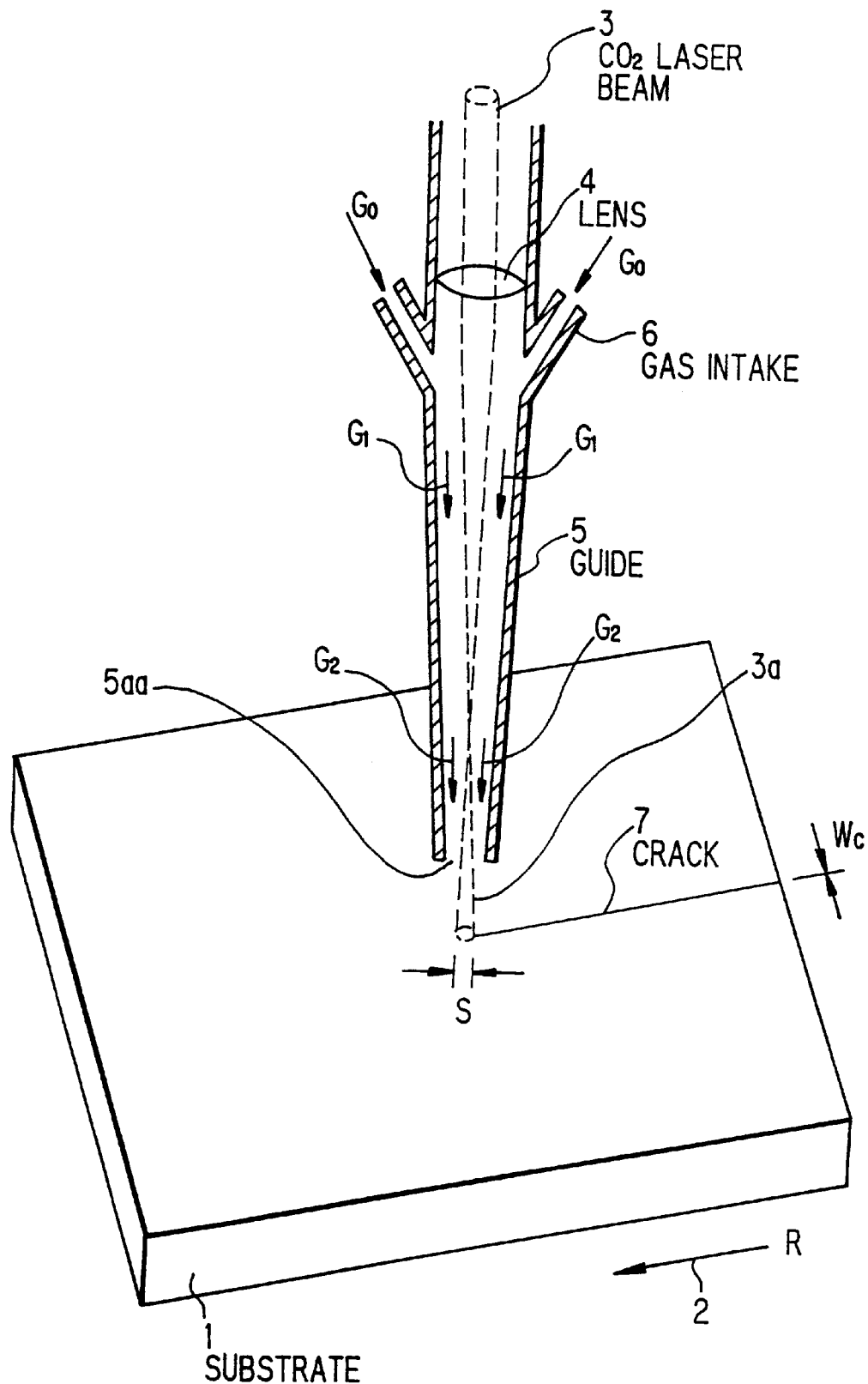
FIG. 9 is an explanatory view showing a method for dicing a substrate in the third preferred embodiment according to the invention.

FIGS. 8 and 9 show a method for dicing a substrate in the third preferred embodiment, wherein like parts are indicated by like reference numerals as used in FIGS. 3 and 4. In the embodiment, the laser beam 3 is converged by the lens 4 and focused at the point O inside the guide 5.

In the embodiment, it is first required that the laser beam 3 is designed to be defocused at the surface of the substrate 1. Preferably the distance D is determined to result in a beam spot diameter S of approximately 500~2000 $\mu$m, which is approximately 8~16 mm.

Second, it is required that a flow of assist gas $G_0$, $G_1$, $G_2$ supplied from the gas intake 6 surrounds the laser beam 3. In this case, it is important that the tip of the nozzle 5aa (an inside diameter of which is 1.5 mm~2 mm) of the guide 5 is closely disposed in the vicinity of the surface of the substrate 1. The distance H is determined to be at least 5 mm. In this arrangement, optical energy distribution inside the beam spot diameter S becomes almost flat. In addition the tip of the nozzle 5aa is positioned close to the surface of the substrate 1 so that much less gas pressure, i.e. gas flow rate, is required, and energy and cost saving operation is realized. The assist gas may include $N_2$, Ar, air, $O_2$ or mixture of such gas. The pressure needs to be at least 0.5 Kg/cm$^2$, but it is quite lower than 2 Kg/cm$^2$ required in the first preferred embodiment when the distance H is 10 mm. Furthermore, such arrangement keeps not only the laser beam 3 clean in the environment but also the surface of the substrate 1 dry and clean, then a clean and uniform operation is realized. The gas pressure becomes higher, the less micro-cracks are generated and flatter diced planes are obtained. In the embodiment, a continuous wave-oscillation laser beam need to be used as the laser beam 3.

The output power of the laser beam, the moving rate of the substrate, and the selection of the oscillation wavelength of the laser beam is also preferably considered in the same manner as in the first preferred embodiment. The output power of at least 50 W and the moving rate of at least S mm/sec are necessary in the embodiment. The value of the output power of the laser beam is measured at the focus O without gas flow. In the embodiment, as shown in FIG. 9, a leading crack 7 due to thermal stress occurs and develops by closely following the track of the laser beam, then the substrate 1 breaks with the dicing margin width Wc of zero.

Figure 10:
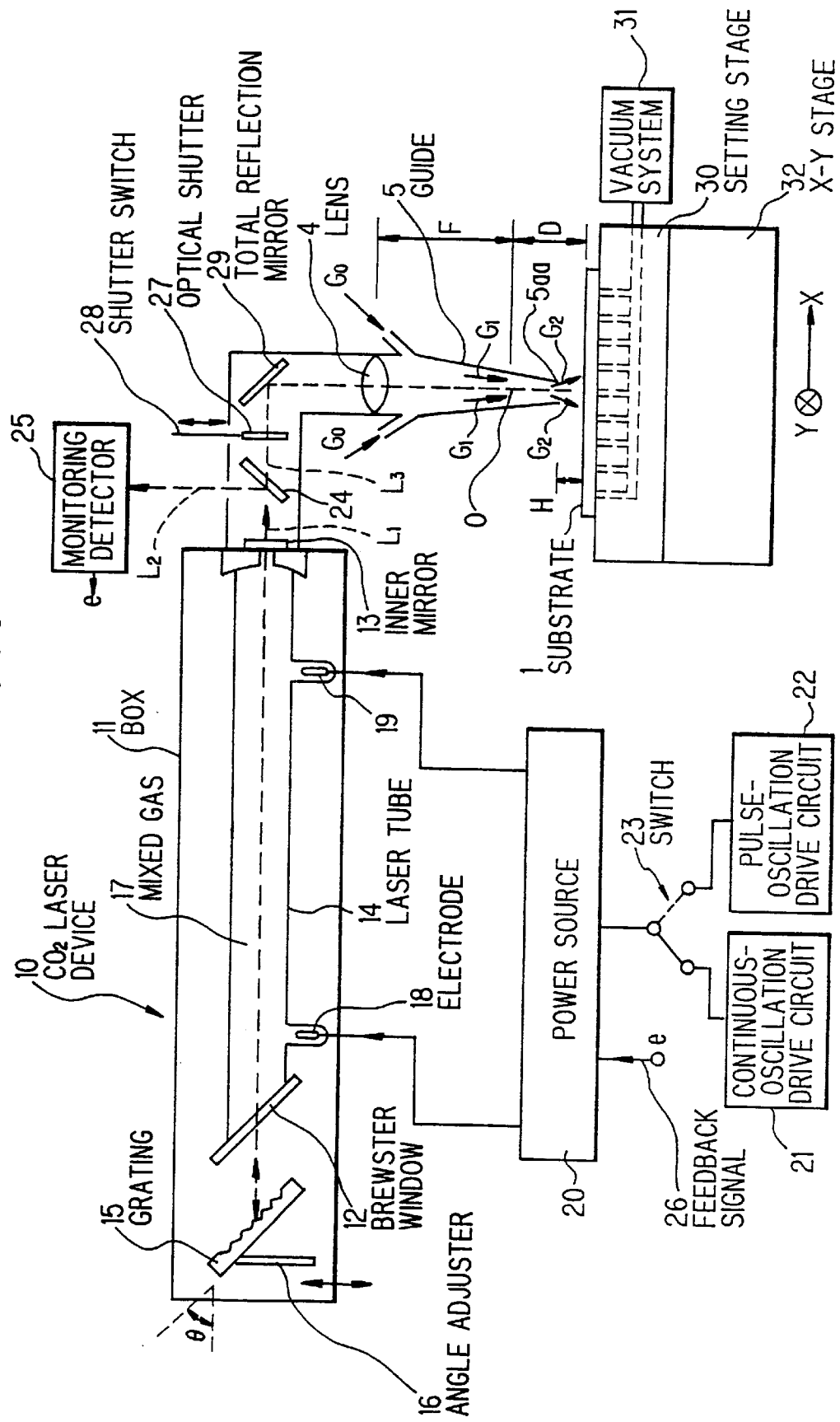
FIG. 10 is an explanatory view showing an apparatus for dicing a substrate in a third preferred embodiment according to the invention.

FIG. 10 shows an apparatus for dicing & substrate in the third preferred embodiment, wherein like parts are indicated by like reference numerals as used in FIG. 5. In the embodiment, the focus O of the laser beam 3 is positioned inside the guide 5, which is the difference from the apparatus shown in FIG. 5.

FIG. 11 shows a method for dicing a substrate in the third preferred embodiment using the apparatus shown in FIG. 10, which is preferably used for dicing a certain kind of substrate having difficulty in generating cracks due to thermal stress by tracing the laser beam, such as an alkali-free glass substrate, a borosilicate glass substrate, etc. Now referred to FIGS. 9 and 10, a laser beam is irradiated by driving the pulse-oscillation drive circuit 22, and generating an initial crack C1 at one edge of the substrate 1 (thickness t=1.1 mm). The pulse width thereof is chosen from 100 $\mu$sec~2 msec, and the repetition speed is 50 pps~1 kpps. Next, assist gas $G_0$ ($N_2$, its pressure of more than 0.5 Kg/cm$^2$) is supplied and the pulse-oscillation drive circuit 22 is switched to the continuous wave-oscillation drive circuit 21 by the switch 23. The laser beam (the output power of which is 60 W at point O) is traced from one side of the substrate 1 to the other at a constant rate (10 mm/sec), the initial crack 33 is developed into a leading crack 34, and breaks.

If the distance H between the tip of the nozzle 5aa and the surface of the substrate 1 is kept constant, which is about 5 mm, then the width M of the gas blown on the surface of the substrate 1 becomes narrow (less than 3 mm), and the leading crack C2 develops closely following the track of the laser beam 3a. As the width becomes wider, the straightness of the leading crack C2 and the verticality of the edge become worse. Therefore it is important that the distance H is at least 5 mm. It is preferable that the initial crack C1 is created by making the beam spot diameter as narrow as possible. This improves the straightness of the leading crack by the following continuous wave-oscillation. The substrates of alkali-free glass having a thickness t of 0.7 mm~2.2 mm are diced.

Figure 12:
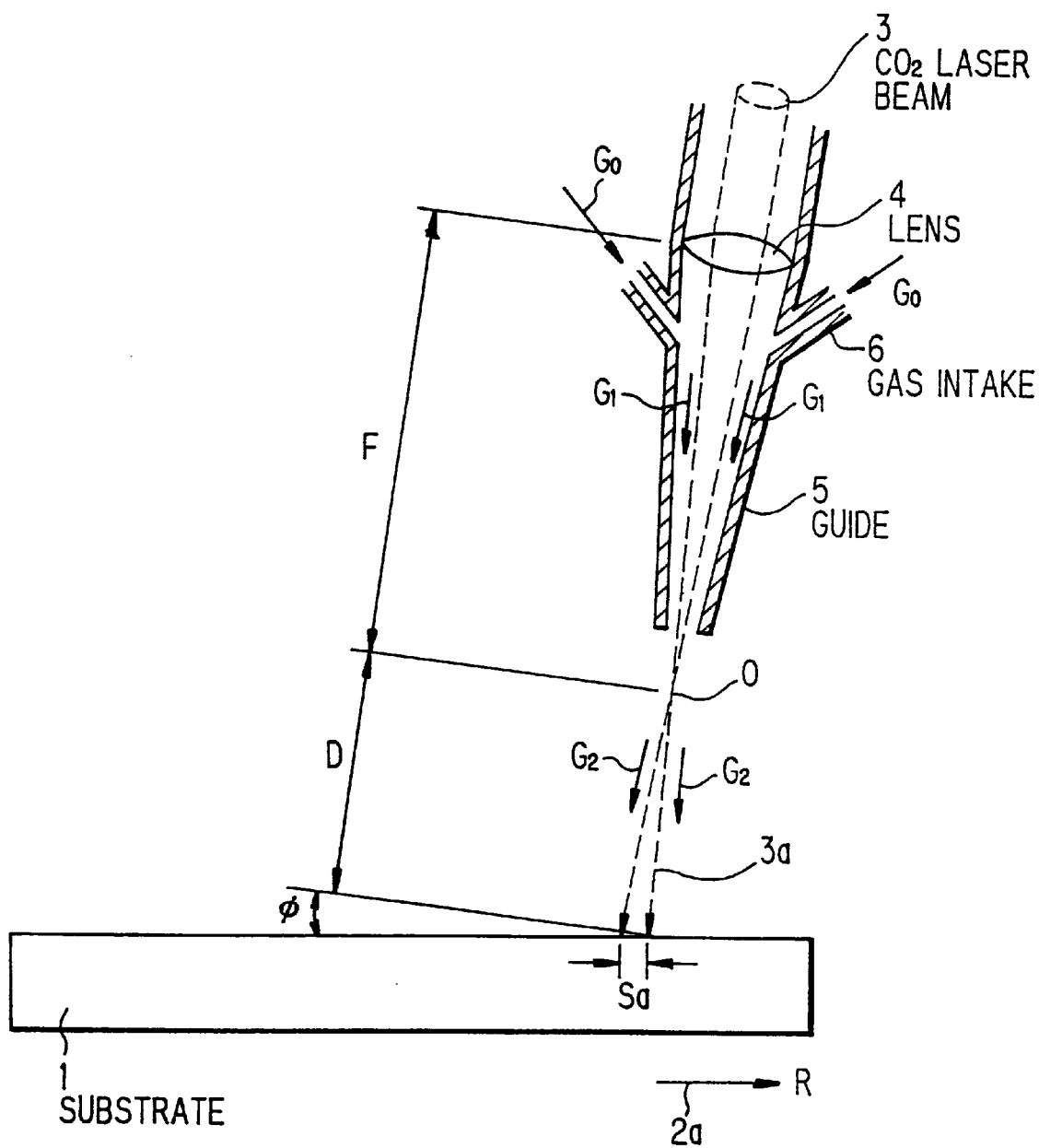
FIG. 12 is an explanatory view showing a method for dicing a substrate in a fourth preferred embodiment according to the invention.

FIG. 12 shows a method for dicing a substrate in the fourth preferred embodiment, wherein like parts are indicated by like reference numerals as used in FIG. 3. The difference from the first preferred embodiment is that the direction of the irradiating laser beam is inclined by $\phi$ from the normal of the substrate 1 and the substrate 1 is moved in the incline direction 2a. That is to say, if the laser beam 3a is irradiated in vertical direction, the substrate 1 may be inclined by $\phi$ from 90° against the irradiation direction, and moved in the inclined direction. Or if moving the substrate horizontally, the laser beam 3a which is inclined by $\phi$ against the vertical direction is irradiated.

In the embodiment, as the laser beam 3a is inclined by $\phi$ against the moving direction of the substrate, energy distribution becomes sharp in the direction. That leads the development of a leading crack due to thermal stress just toward the moving direction of the substrate 1. Therefore, dicing follows the track of the laser beam so closely that it is suitable for good straight dicing operation. When the laser beam is inclined against the substrate by angle $\phi$, the beam spot becomes almost elliptic. The distance D need to be determined so that the long axis of the elliptic beam spot Sa is 500 $\mu$m~2000 $\mu$m long. In this case, the distance D is to be 6 mm~14 mm. The gas pressure is at least 1 Kg/cm$^2$. If the gas pressure is low, micro-cracks occur. The higher it is, the flatter dicing edges are obtained. However, if it is too high (75 Kg/cm$^2$), optical energy decreases inside the beam spot and dicing becomes difficult. It is preferable to use a continuous wave-oscillation laser beam.

The output power of the laser beam, the moving rate of the substrata, and the election of the oscillation wavelength of the laser beam is also preferably considered in the same manner as in the first preferred embodiment.

The inclination $\phi$ is preferably from several degrees to over ten degrees. In this ranges the larger it is, the wider are the process conditions obtained. If it is too small, the directional development of the leading crack becomes weak. In contrast, if it is too large, energy distribution becomes so sharp that micro-cracks are induced an the edges, which requires another mechanical structure to move the substrate with inclination $\phi$ and makes the apparatus complex.

Figure 13:
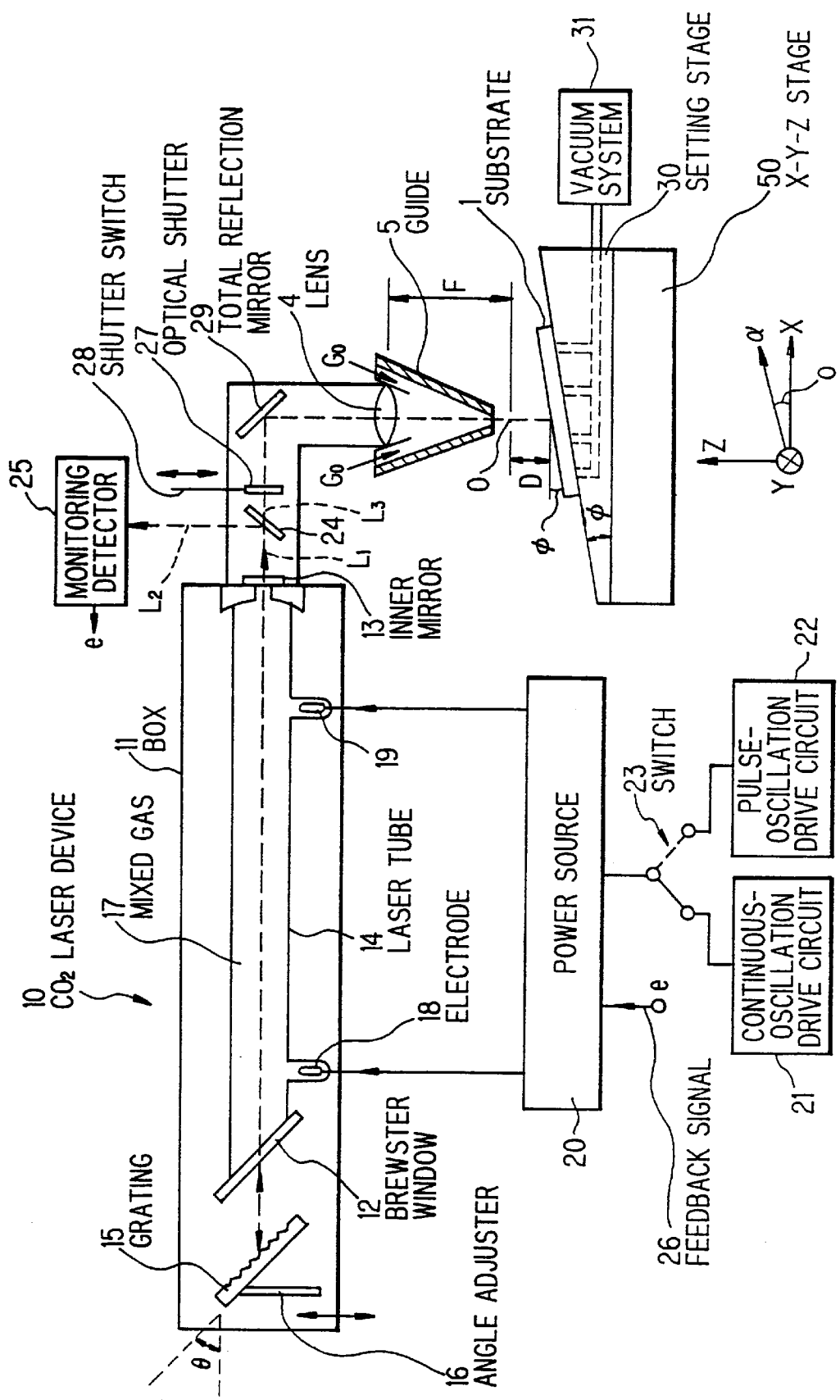
FIG. 13 is an explanatory view showing an apparatus for dicing a substrate in a fourth preferred embodiment according to the invention.

FIG. 13 show an apparatus for dicing a substrate in the fourth preferred embodiment, wherein like parts are indicated by like reference numerals as used in FIG. 5. In the embodiment, the difference from the first preferred embodiment is that setting stage 30 is inclined by $\phi$ in the X direction, and moved by the X-Y-Z stage 50. In this Case, the laser beam is irradiated with the constant distance D.

In operation, the setting stage 30, on which the substrate 1 is absorbed by the vacuum system 31, is moved in -X and -Y directions by the X-Y-Z stage 32. The laser beam is irradiated and the gas is blown off. The substrate 1 is diced in a direction.

Now, some examples according to the fourth preferred embodiment shown in FIG. 13 are explained below, but it is understood that the invention is not limited by these figures.

EXAMPLE 1

An alumina substrate of 1 mm thick, 150 nm long and 50 mm wide is used. The substrate is inclined by 5° and moved at the moving rate of 8 mm/sec in $\alpha$ direction. The output power of the laser beam of 80 W, the distance F of 25.6 mm are set, and the distance D and the pressure of the assist gas G0 is varied. As a result, dicing is possible within the distance D of 8 mm~14 mm without micro-cracks. The gas pressure is preferably 1 $Kg/cm^2$~3 $Kg/cm^2$.

EXAMPLE 2

The moving rate of the substrate is varied within 6 mm/sec~10 mm/sec under the same conditions as EXAMPLE 1. Almost good dicing results are obtained, But if the moving rate becomes high, larger D is necessary, and if it becomes low, smaller D is necessary.

EXAMPLE 3

The inclination φ is varied within 3°~15° under the same conditions as EXAMPLE 1. The inclination φ becomes large, higher gas pressure is necessary, but the limits of dicing process conditions, such as gas pressure, moving rate of the substrate and distance D, are expanded.

EXAMPLE 4

Alumina substrates and mullite substrates of 0.5 mm~4 mm thick are used under the same condition as EXAMPLE 1. The result is good, but the output power of the laser beam is to be increased from 50 W to 140 W maximum due to the thickness of the substrate. The moving rate of the substrate is within 5 mm/sec~28 mm/sec.

EXAMPLE 5

Alkali-free glass substrates and borosilicate glass substrates of 0.7 mm~1.1 mm thick are used under the same condition as. EXAMPLE 1. Flat surfaces without micro-cracks are obtained at the edge.

As well explained above, the invention provides advantages set out below.

(1) a laser beam is focused above a substrate in a certain distance so that a defocused laser beam is irradiated on the surface of the substrate, and a gas is blown off thereon at certain constant pressure during dicing. Therefore, the generation of micro-cracks are suppressed and flat diced planes are obtained.

(2) a pulse-oscillation laser beam is irradiated and an initial crack is intentionally generated at one edge of the substrate. Starting from the initial crack, a continuous wave-oscillation laser beam is traced from one side the other. Then the initial crack 33 is developed into a leading crack, and break. It is useful for dicing a certain substrate having difficulty in generating cracks due to thermal stress by tracing the laser beam, such as multi-component glass substrates.

(3) a defocused laser beam is irradiated on the inclined surface of a substrate. Therefore, dicing closely follows the tracks of the laser beam.

Although the invention has been described with respect to specific embodiment for complete and clear disclosure the appended claims are not to be thus limited but are to be construed as embodying all modification and alternative constructions that may be occur to one skilled in the art which fairly fall within the basic teaching here is set forth.

What is claimed is:

1. A method for dicing a substrate, comprising the steps:
generating a laser beam along a path defined by a guide and onto a substrate;
introducing a gas into the guide for surrounding said laser beam at a predetermined constant pressure;
moving the substrate along a predetermined path relative to said laser beam;
focusing said laser beam above said substrate at a predetermined distance so that a defocused laser beam is projected onto the surface of said substrate;
generating a crack on said substrate by irradiating said laser beam thereon; and
developing the crack along said predetermined path by directing said gas onto the surface of said substrate.

2. A method for dicing a substrate, according to claim 1, wherein the predetermined constant pressure of said gas is at least 2 $Kg/cm^2$.

3. A method of dicing a substrate according to claim 2 wherein said laser beam is a $CO_2$ laser beam which is focused between a tip of said guide and said substrate, and wherein said laser beam is focused at a distance of at least 8 mm from said substrate.

4. A method for dicing a substrate, according to claim 3, wherein said $CO_2$ laser beam is a continuous wave-oscillation laser beam.

5. A method for dicing a substrate, according to claim 3, wherein:
an output power of said $CO_2$ laser beam is at least 50 W; and
the step of moving said substrate is performed at a rate of at least 5 mm/sec.

6. A method for dicing a substrate, according to claim 1, wherein the predetermined constant pressure of said gas is at least 0.5 $Kg/cm^2$.

7. A method of dicing a substrate according to claim 6 wherein said laser beam is a $CO_2$ laser beam which is focused inside said guide at a distance of at least 8 mm from said substrate.

8. A method for dicing a substrate, according to claim 7, wherein said guide is positioned so that the tip thereof is at least 5 mm from the surface of said substrate.

9. A method of dicing a substrate, comprising the steps:
generating a laser beam along a path defined by a guide;
introducing a gas, at a predetermined constant pressure, into the guide to surround said laser beam; and
moving a substrate along a predetermined path and at a predetermined angle of inclination relative to said laser beam;
focusing said laser beam above said substrate at a predetermined distance so that a defocused laser beam is projected onto the surface of said substrate; and
dicing said substrate by irradiating said laser beam while directing said gas onto the surface of said substrate.

10. A method for dicing a substrate, according to claim 9, wherein:
said predetermined distance is at least 6 mm, and
said predetermined constant pressure is at least 1 $Kg/cm^2$.

11. A method for dicing a substrate, according to claim 9, wherein:
said laser beam is irradiated in vertical direction, and
said predetermined angle of inclination is measured relative to a vertical direction.

12. A method for dicing a substrate, according to claim 9, wherein the moving step is performed in stepwise displacements and at a rate of at least 5 mm/sec.

13. An apparatus for dicing a substrate, comprising:
a laser source for outputting a laser beam;
a monitoring device for monitoring a part of said laser beam;

an output signal generated by said monitoring device in response to predetermined conditions, said output signal being redirected to said laser source in a feedback loop;

a focusing assembly for converging and focusing said laser beam above said substrate and directing a defocused laser beam on a surface of said substrate;

a moving stage capable of movement in at least one direction in order to facilitate irradiation of said laser beam on said substrate along a predetermined dicing path;

a guide for enclosing said laser beam and receiving a gas at a predetermined constant pressure from an external source, said guide directing said gas onto the surface of said substrate where said defocused laser beam is directed in order to generate thermal stress that results in a crack and propagating said crack along said predetermined dicing path; and a setting stage for securely receiving said substrate.

14. An apparatus for dicing a substrate, according to claim 13, wherein:

said laser beam is a $CO_2$ laser beam; and said laser beam source includes an output port, and an optical shutter disposed between said output port and said focusing assembly.

15. An apparatus for dicing a substrate, according to claim 13, wherein said laser source includes a switch for changing the operation thereof from a pulse-oscillation mode to a continuous wave-oscillation mode.

16. An apparatus for dicing a substrate, comprising:

a laser source for outputting a laser beam;

a first monitoring device for monitoring a part of said laser beam;

a first output signal generated by said monitoring device in response to predetermined conditions, said output signal being redirected to said laser source in a feedback loop;

a focusing assembly for converging and focusing said laser beam above a substrate;

an optical shutter positioned between an output port of said laser source and said and focusing assembly;

a guide for enclosing said laser beam receiving a gas at a predetermined constant pressure from an external source, and directing said gas onto a surface of said substrate;

a setting stage for securely receiving said substrate;

a moving stage capable of movement in at least one direction in order to facilitate irradiation of said laser beam on said substrate along a predetermined dicing path;

a second monitoring device for visually monitoring a dicing position on said substrate and outputting a second signal; and a controller for controlling the operation of said moving stage for positioning said substrate at a predetermined position, an output power of said laser source, said optical shutter, and said gas, said controller operating in response to said second output signal.

17. An apparatus for dicing a substrate, according to claim 16 wherein said substrate includes at least one alignment mark on a surface thereof, said alignment mark being suited for monitoring by said second monitoring device.

18. An apparatus for dicing a substrate, comprising:

a laser source for outputting a laser beam;

a monitoring device for monitoring a part of said laser beam;

an output signal generated by said monitoring device in response to predetermined conditions said output signal being redirected to said laser source in a feedback loop;

a focusing assembly for converging and focusing said laser beam above a substrate;

a guide for enclosing said laser beam receiving a gas at a predetermined constant pressure from an external source and directing said gas onto a surface of said substrate;

a setting stage for securely receiving and elevating said substrate at a predetermined angle of inclination relative to said laser beam; and a moving stage capable of movement in at least one direction along an inclined surface of said setting stage for irradiating said laser beam on said substrate along a predetermined dicing path.

19. An apparatus for dicing a substrate, according to claim 18, wherein said laser source includes a switch for changing the operation thereof from a pulse-oscillation mode to continuous wave-oscillation mode.

20. An apparatus for dicing a substrate, according to claim 18, wherein:

said substrate includes at least one alignment mark on a surface thereof; and said laser source includes a second monitoring device for visually monitoring said alignment marks.

21. A method for dicing a substrate comprising the steps:

generating a pulse-oscillation laser beam along a path defined by a guide;

generating an initial crack by irradiating said pulse-oscillation laser beam onto one side of a static substrate;

generating a continuous wave oscillation laser beam along the path defined by said guide;

introducing a gas at a predetermined constant pressure, into the guide to surround, said continuous wave-oscillation laser beam;

moving said substrate along a predetermined path relative to said continuous wave-oscillation laser beam;

focusing said laser beam above said substrate at a predetermined distance so that a defocused laser beam is projected onto the surface of said substrate; and dicing said substrate by irradiating said continuous wave oscillation laser beam so as to develop said initial crack into a break; and developing said break along said predetermined path by directing said gas onto the surface of said substrate.

22. A method for dicing a substrate, according to claim 7, wherein said substrate is a multi-component glass substrate.

* * * * *

UNITED STATES PATENT AND TRADEMARK OFFICE
CERTIFICATE OF CORRECTION

Figure 6A:
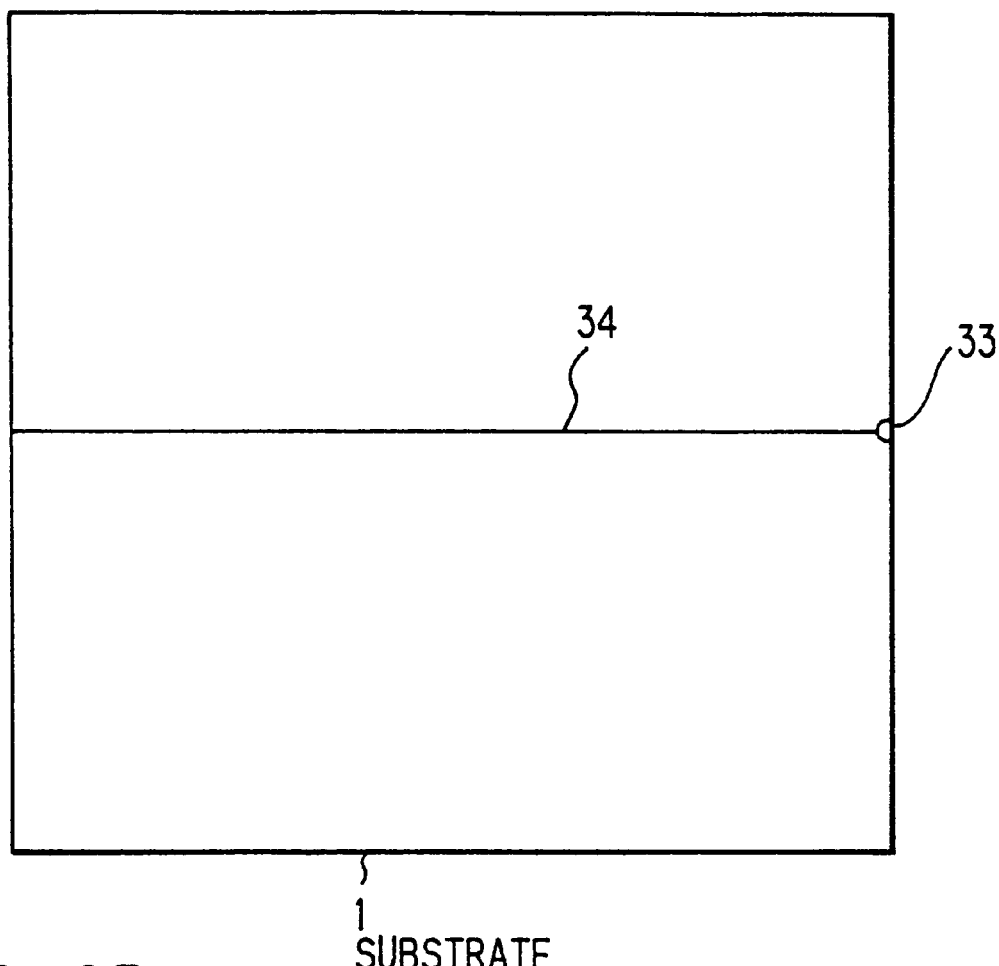
FIG. 6 is for a plane view (a) and a side view (b) showing a method for dicing a substrate in a second preferred embodiment according to the invention.
Figure 6B:

PATENT NO. : 5,916,460
DATED : June 29, 1999
INVENTOR(S) : Katsuyuki IMOTO, et al It is certified that error appears in the above-identified patent and that said Letters Patent is hereby corrected as shown below:

IN THE SPECIFICATION:

Col. 2, Line 38, change "Fig. 6 is for" to --Figs. 6A and 6B are--; and

Figure 11A:
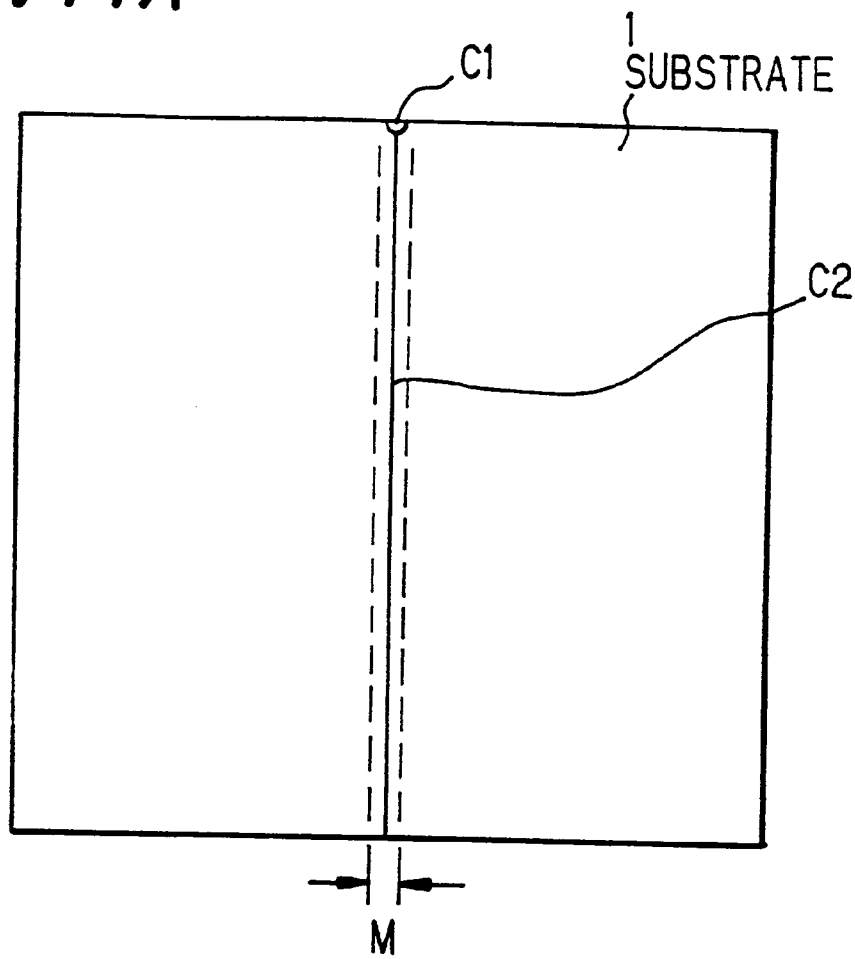
FIG. 11 is for a plane view (a) and a side view (b) showing a substrate diced by the method in the third preferred embodiment shown in FIG. 9.
Figure 11B:
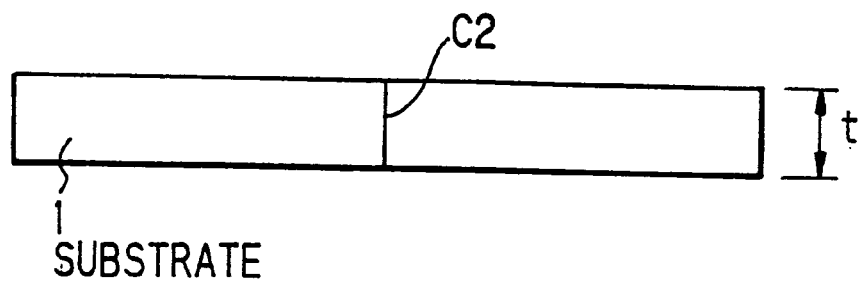

Col. 2, Line 54, change "Fig. 11 is for" to --Figs. 11A and 11B are--.

Signed and Sealed this

Twenty-eighth Day of December, 1999

Attest:

Q. TODD DICKINSON

Attesting Officer        Acting Commissioner of Patents and Trademarks